United States Patent [19]

Bays

[11] 4,230,201
[45] Oct. 28, 1980

[54] AIR RELEASE CONTROL IN SEISMIC ENERGY SOURCE AIR GUN

[75] Inventor: Marvin G. Bays, Dallas, Tex.

[73] Assignee: Texas Instruments Incorporated, Dallas, Tex.

[21] Appl. No.: 929,883

[22] Filed: Jul. 31, 1978

[51] Int. Cl.³ .......................... G01V 1/14; G01V 1/38
[52] U.S. Cl. .................................. 181/115; 181/118; 367/144
[58] Field of Search ....................... 181/106, 115, 118; 340/7 R, 12, 7; 73/362; 116/137 R, DIG. 18; 367/144

[56] References Cited

U.S. PATENT DOCUMENTS

| | | | |
|---|---|---|---|
| 3,249,177 | 5/1966 | Chelminski | 181/118 |
| 3,276,534 | 10/1966 | Ewing et al. | 181/120 |
| 3,369,627 | 2/1968 | Schempf | 181/120 |
| 3,653,460 | 4/1972 | Chelminski | 181/120 |
| 3,750,097 | 7/1973 | Herolih et al. | 181/115 |
| 4,047,591 | 9/1977 | Word et al. | 340/12 R |
| 4,141,431 | 2/1979 | Baird | 181/118 |

OTHER PUBLICATIONS

Kramer et al, "Seismic Energy Sources 1968 Handbook," 10/68, pp. 19–36, Bendix Corp., 38th Annual Meeting of the SEG, Denver Colorado.

Primary Examiner—Nelson Moskowitz
Attorney, Agent, or Firm—Melvin S. Sharp; Leo Heitinup; Thomas G. Devine

[57] ABSTRACT

Disclosed is a seismic source device, known in the industry as an air gun, having shuttle control for allowing a predetermined discharge of compressed air into water for purposes of seismic exploration. The shuttle is controlled by secondary shuttle means for closing the exhaust ports before all of the compressed air in the firing chamber of the air gun is exhausted. This point of closing the exhaust ports before virtually all of the compressed air is discharged differs from prior art air guns. By preventing further discharge of air, secondary pulses are greatly reduced, thereby enhancing the operation of the entire system. Further, by preventing all the air in the firing chamber from being discharged, the system becomes more efficient and more cost effective.

15 Claims, 2 Drawing Figures

AIR RELEASE CONTROL IN SEISMIC ENERGY SOURCE AIR GUN

BACKGROUND OF THE INVENTION

This invention relates to seismic source devices and more particularly a shuttle controlled seismic source device which allows only a portion of the air found in the firing chamber of the device from being discharged into the surrounding environment.

In marine seismic exploration, a source of acoustic energy is released into the water every few seconds in order to obtain appropriate acoustic waves that propagate into the earth's surface. These waves are reflected at interfaces of the subsurface formations and propagated back to instruments where transducers convert the acoustic waves to electronic signals which are recorded and later processed into a record section for interpretation of the subsurface formations. Marine seismic exploration is of two types, the first type being on water where the seismic source units are strung or towed from a water vehicle. The second type of marine seismic exploration is arctic marine exploration where the seismic source units are disposed below an ice layer to determine the formation of the rock surfaces below the ice layer.

During the past decade, the major marine seismic energy source has been the air gun. An air gun as in the prior art releases high-pressure air (typically 2000 PSI up to 6000 PSI or even more) into the water to create the desired acoustic wave.

State of the art air guns normally comprise an annular housing that contains means for discharging compressed air through exhaust ports in the housing. Compressed air is stored within the housing is a firing chamber. The only moving component (except for the solenoid triggering device) in the state of the art air guns is a shuttle, which when raised, permits air to escape from the firing chamber through the exhaust ports in the main housing into the surrounding water. The size of the gun is determined by the firing chamber volume selected. By having a constant source of compressed air through an inlet passage in the housing, the upper chamber containing the shuttle is filled and forces the shuttle into a sealed position closing off all exhaust ports from the firing chamber. By using a solenoid valve to allow air flow underneath the shuttle flange thus forcing the shuttle upward and causing an unequal pressuring on the shuttle pistons opposing each other on the shuttle shaft, the shuttle is accelerated in the upward direction exposing the chamber exhaust ports and allowing compressed air to escape into the surrounding water. When the shuttle is in the down, or closed position, the air gun is charged and ready for firing. When fired, the state of the art air gun allows 80–90% of the air in the firing chamber to be exhausted into the water. Consequently, prior art air guns suffer two major disadvantages: first, the efficiency of the air gun for converting stored energy to useful acoustic energy in the seismic passband is well below 10%, and second, the undesirable secondary pressure pulses follow the first acoustic pulse and obscure or confuse the time of the reflected signals.

Several approaches have been taken by the industry to overcome this second disadvantage of undesirable secondary pressure pulses. However, it has been found that the solutions provided are either the cause for a less efficient system of converting stored to acoustic energy or result in greater expense in processing the data. Among the methods presently employed to reduce secondary pulse amplitudes are those that include throttling additional air into the bubble as it forms outside the chamber with a so-called "wave shaping kit" using an array of guns of different sizes, and thus different bubble pulse periods, to destructively reduce the secondary pulse periods and finally, "signature correction" techniques in data processing to reduce the secondary pulses recorded. "Signature" may be defined as the recorded wavelet or sound pressure level of the acoustic pressure discharged into the water over a fixed period of time.

This problem is solved by the present invention by carefully controlling the release of air from an improved air gun to greatly increase its efficiency while reducing the undesirable secondary pressure pulses.

SUMMARY OF THE INVENTION

In accordance with the present invention, a seismic source device is provided having a segmented housing with a provision for an inner chamber for storing compressed air. The first section of the housing possesses two air inlets for providing compressed air passage to the inner chamber. Further, in the first section of the segmented housing, a shuttle unit is provided for sealing off exhaust ports found in the housing, thus preventing compressed air from exhausting through these ports. The shuttle found in the first section of the segmented housing is actuated by a solenoid valve element which allows air to force the shuttle in an upward direction exposing the exhaust ports and thus discharging compressed air from the inner chamber.

By placing a means for controlling the shuttle found in the first section of the segmented housing in the second section of the housing, the exhaust ports may be closed soon after the initial discharge thus preventing complete exhaustion of the inner chamber and making the seismic exploration more cost effective, efficient, and reducing undesirable secondary pulses in the acoustic signal. One possible means for controlling the shuttle found in the first segment of the housing is a secondary shuttle disposed in the second section of the housing. At the instant of maximum discharged air pressure level, the second shuttle prevents further discharge of the air found at the greatest pressure in the inner chamber from escaping, and thus allows the compressed air coming in from the air inlets to force the primary shuttle downward sealing off the exhaust ports.

BRIEF DESCRIPTION OF THE DRAWINGS

For a more complete understanding of the present invention, reference may now be made to the following description taken in conjunction with the accompanying drawings in which.

DETAILED DESCRIPTION OF THE DRAWINGS

Figure 1:
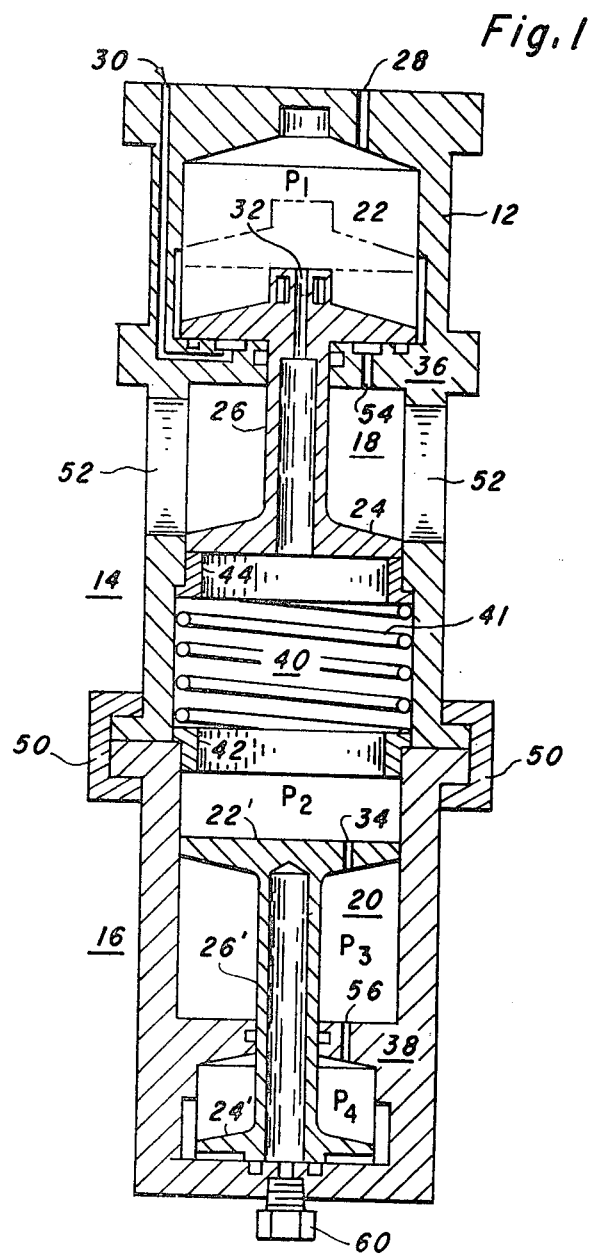
FIG. 1 is a complete cross sectional view of a seismic source unit in accordance with the present invention.

Referring now to the figures and more specifically to FIG. 1, a seismic source unit displaying shuttle control is illustrated. The seismic source Unit 10 comprises a housing 12 that may be sectionalized into a first housing 14 and second housing 16. In the prior art the second housing 16 contained either an empty chamber for storing compressed air or a fixed, divided chamber otherwise known as the firing chamber. The seismic source unit of the present invention, utilizing shuttle control, places a primary shuttle 18 in the first housing 14, and a secondary shuttle 20 in the second housing 16. The primary shuttle 18 has opposing annular pistons 22 and 24 connected by a shaft 26. The secondary shuttle 20 also has opposing annular pistons 22' and 24' connected by a shaft 26'. Both the primary and secondary shuttles 18 and 20 are sliding shuttles within their respective housings 14 and 16.

The first housing 14 containing primary shuttle 18 provides two air inlet passages 28 and 30. Inlet passage 28 provides compressed air to the inner chamber of housings 14 and 16. Inlet passage 30 is further connected to a solenoid valve, not shown, which actuates the primary shuttle 18 as described hereinafter.

Primary shuttle 18 further provides for an orifice 32 found in the center of shaft 26. Secondary shuttle 20 provides for an orifice 34 through its annular piston 22'.

The inner chamber of the seismic air unit 10 may be divided into a plurality of air chambers such as those found in FIG. 1 labeled P1, P2, P3, and P4. The sliding shuttles 18 and 20 are disposed within their respective chambers 14 and 16 such that the annular pistons 22 and 24' are capable of seating against cross member structures 36, found in the first sectional housing 14, and 38 found in the second sectional housing 16, respectively for purposes of seating the annular pistons 22 and 24'. Further, the sliding shuttles 18 and 20 have their respective shafts 26 and 26' sliding through a cutout in their respective cross members 36 and 38.

In order to effectively seat the annular pistons 24 and 22' when their movement is not restricted by a pressurized air cushion, a resilient seating capability 40 is necessary. Such a capability is made possible by utilizing elastic means which may be in the form of a spring element 41 in combination with angular support members 42 and 44.

Since the volumetric size of the chamber determines the size or firing power of the seismic source unit, variable housing sizes may be used for said second housing 16. Providing clamps 50 to hold the first and second housings 14 and 16 together allows for the use of a variable size firing chamber or second housing 16. Also, in order to effectively discharge an acoustic signal into the water as a result of forcing air out of the seismic source unit 10, a plurality of discharge or exhaust ports 52 are provided.

Figure 2:
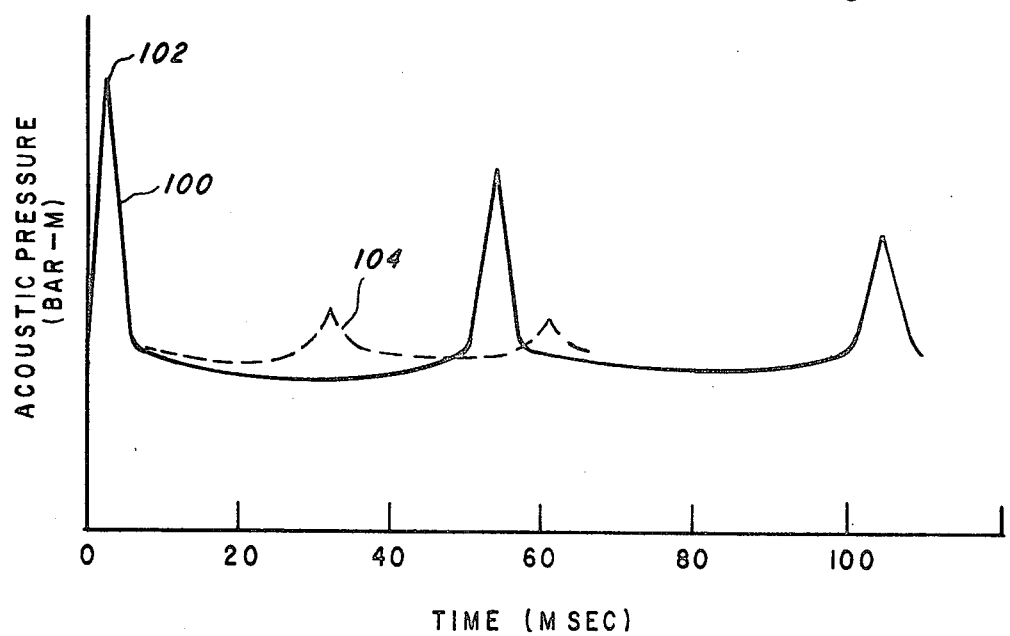
FIG. 2 is a graphical representation of an acoustic pulse signal.

In describing the operation of the seismic source unit 10 found in FIG. 1 it is necessary to refer to both FIGS. 1 and 2, with FIG. 2 illustrating an acoustic pulse signal as a function of time. In the prior art, upon the firing of a seismic source unit, a shuttle similar to the primary shuttle illustrated in FIG. 1 is forced by use of an actuating means, such as a solenoid element, to force the shuttle upward thereby releasing the compressed air found in the lower firing chamber. This action results in an acoustic pulse signal similar to the signal found in FIG. 2 represented by the solid line 100. As can be seen from the graph, the peak output sound pressure level 102 is reached in a very short time, 1.3 m sec, and continuing the firing cycle, i.e. keeping the shuttle in the upward position and allowing further air to escape, results in wasted energy and further causes unwanted oscillating bubbles in the water media which result in secondary acoustic pressure pulses which generally distract from the primary pressure pulse for recording purposes.

In accordance with the present invention utilizing shuttle control, i.e. primary shuttle control, the unit reduces the firing cycle by closing the exhaust ports before all the compressed air is discharged from the firing chamber and saves compressed air, i.e. energy, and further reduces secondary pulses thereby enhancing the value of the recorded primary acoustic pulse. A representation of such an acoustic signal from the present invention is the dotted line 104 in FIG. 2. Here the secondary pulses are reduced and do not interfere with the primary pulse.

Operationally, the seismic unit 10 is provided with compressed air from the source of supply through air inlet 28. This compressed air fills chamber P1 prior to filling chambers P2, P3, and P4. As the pressure rises in chamber P1, air is further forced into chamber P2 through orifice 32, and into chamber P3 through orifice 34 in annular piston 22'. This provides compressed air into P3 and finally through orifice 56 into the lowest chamber in the seismic source unit 10, P4. Upon being fully charged, and in equilibrium, the seismic source 10 chambers P1–P4 have equal pressures. As compressed air is forced through inlet 28 prior to reaching this equilibrium condition, the primary shuttle 18 is forced into a downward position where its annular piston 22 seats onto crossmember 36 further seating its annular piston 24 onto the resilient seating means 40 and more specifically onto annular member 44. Further following the path of the compressed air as it flows through chamber P2, the secondary shuttle will also be forced into a downward position having its annular piston 24' seated at the bottom of the P4 chamber within the second housing 16. While the seismic source unit 10 is in the equilibrium condition or firing position, the discharge ports 52 are blocked or covered by the shuttle 18 thus preventing any compressed air from being discharged into the surrounding water.

In order to fire the seismic source unit, i.e. discharge or exhaust compressed air into the surrounding water, it is necessary to actuate the primary shuttle 18. This may be accomplished by use of a solenoid valve, not shown in FIG. 1, whereby compressed air is forced under annular piston 22 through inlet 30, thus releasing the primary shuttle 18's seating forces and explosively accelerating it upward as shown by the dashed line in the figure. Air from the solenoid air inlet is exhausted to the outside media through orifice 54. This motion causes compressed air to be released from discharge ports 52 thus decreasing the pressure in chamber P2 and causing the pressure in chamber P3 to explosively accelerate secondary shuttle 20 upward against the resilient seating 40 and more specifically against angular member 42. Further, assisting in decelerating the secondary shuttle 20, in its upward flight is the cushioning function of flange 24' as it approaches the upper extremities of chamber P4. The air in chamber P4 is allowed to flow around flange 24' (as the shuttle moves upward until peak output air pressure level is reached near the end of its travel). At that point air above the flange 24' in chamber P4 is trapped and provides some of the necessary decelerating force required to stop the motion of shuttle 20 as it reaches seats 42. The remainder of the impact is absorbed by resilient means 40. However, after secondary shuttle 20 has traveled a distance x, thereby sealing chambers P3 and P4 from further exhaustion of compressed air, no further air is discharged from chambers P3 and P4 through discharge ports 52. This termination of air being discharged upon firing is caused by the sudden reseating of the primary shuttle 18 onto the resilient seating member 40. This reseating or downward shuttle motion is due to the sudden drop in P2 chamber pressure which becomes less than the supply pressure found in chamber P1, thus forcing the primary shuttle 18 into a downward slide. Once the primary shuttle 18 is seated on resilient seating member 40, again the secondary shuttle is forced downward as the pressure in chamber P2 increases until such time as the secondary shuttle is forced into its most downward position, having its annular piston 24' seated at the lower portion of chamber P4; completing the firing sequence and recharging the seismic air unit 10. An air relief valve 60 is connected to the shaft of shuttle 20 to bleed compressed air from the system as needed.

While the invention has been described and illustrated with respect to a specific embodiment, it is understood that changes or modifications can be made without departing from the spirit and scope of the invention as defined by the appended claims. More specifically, although the invention has been described with respect to using a secondary shuttle for controlling the primary shuttle's function of closing off the discharge ports, it will be understood that any means for effectuating the proper change in pressures for allowing the air supply pressure to overcome any inner chamber pressure and thus forcing down the primary shuttle to close off the discharge ports before any adverse secondary acoustic pulses can be released into the surrounding water are contemplated.

What is claimed is:

1. A seismic source apparatus comprising:
   a sectional annular housing having an inner chamber for storing compressed air;
   first air supply means for providing compressed air to said inner chamber;
   primary shuttle means disposed within said housing having
      a first annular piston,
      a second annular piston, and
      an elongated shaft having an orifice centrally located therethrough and connected to said first and second annular pistons such that said first and second annular pistons are located in an opposed parallel relationship to one another;
   actuating means for causing said primary shuttle to move within said housing;
   second air supply means operably associated with said actuating means for supplying compressed air underneath said first annular piston of said primary shuttle for effectuating movement of said primary shuttle;
   seating means connected to said inner chamber for providing a means for sealing said first annular piston;
   resilient supporting means for providing a means for sealing said second annular piston;
   elastic means for supporting said resilient supporting means, biased to resist downward motion, such that when said second annular piston rests upon said resilient supporting means a sealing effect will occur;
   secondary shuttle means disposed within said inner chamber and having
      a first annular piston with an orifice extending therethrough,
      a second annular piston, and
      a hollowed shaft connecting first and second annular pistons such that said first and second annular pistons are located in space parallel relationship to one another.

2. A seismic source apparatus as set forth in claim 1 wherein said actuating means comprises a solenoid.

3. A seismic source apparatus as set forth in claim 1 wherein said elastic means comprises a spring element.

4. A seismic source apparatus as set forth in claim 1 wherein said sectional annular housing comprises an upper and lower housing connected such that said upper housing contains said primary shuttle, said actuating means, and said first and second air supply means and further houses said elastic means, and where said lower housing contains said secondary shuttle.

5. A seismic source apparatus having a supply of compressed air, a housing with at least one exhaust port and actuable shuttle means for abruptly releasing compressed air through the exhaust port, comprising:
   (a) a first section for receiving compressed air from the supply of compressed air and for housing the actuable shuttle means, providing an initial, abrupt flow of compressed air through the exhaust port upon actuation of the shuttle means from a down position;
   (b) a second section in communication with the first section, for containing compressed air at a prescribed pressure to provide the initial abrupt flow; and
   (c) control means disposed within the second section, actuable when the pressure within the second section reaches a predetermined value, to block the exhaust port at substantially a peak output sound pressure level, the pressure from the supply of compressed air then causing the shuttle means to return to its down position.

6. The apparatus of claim 5 wherein at least 40% of the mass of air is retained in the second section after the exhaust port is blocked.

7. The apparatus of claim 5 wherein the shuttle means has an orifice located therethrough communicating with the supply of compressed air at one end and with the second section at the other end to supply the second section with compressed air.

8. A seismic source apparatus comprising:
   (a) a housing having a chamber located within, with a plurality of exhaust ports;
   (b) means for supplying the housing with compressed air;
   (c) means for blocking the exhaust ports disposed within the chamber; and
   (d) means for controlling the means for blocking, preventing complete exhaustion of compressed air from the chamber by again blocking the exhaust ports after initial air discharge from the chamber, the means for controlling comprising a first annular piston with an orifice extending therethrough, a second annular piston and a hollow shaft connecting the first and second annular pistons such that the first and second annular pistons are located in spaced parallel relationship to one another.

9. A seismic source apparatus comprising:
   (a) a housing having a chamber located within, with a plurality of exhaust ports;
   (b) means for supplying the housing with compressed air;

(c) means for blocking the exhaust ports disposed within the chamber; and (e) resilient seating means positioned between the blocking and controlling means, for providing a seal for said means for blocking said exhaust ports before the initial air discharge and further providing a seal for said means for controlling immediately after the initial air discharge.

10. A seismic source apparatus comprising:
(a) a housing having a chamber located within, with a plurality of exhaust ports;
(b) means for supplying the housing with compressed air;
(c) means for blocking the exhaust ports disposed within the chamber;
(d) means for controlling the means for blocking, preventing complete exhaustion of compressed air from the chamber by again blocking the exhaust ports after initial air discharge from the chamber; and
(e) elastic means disposed within the chamber between the means for blocking the exhaust ports and the means for controlling.

11. A seismic source apparatus as set forth in claim 10 wherein said elastic means comprises a spring element.

12. A seismic source apparatus comprising:
(a) a housing having a chamber located within, with a plurality of exhaust ports;
(b) means for supplying the housing with compressed air;
(c) means for blocking the exhaust ports disposed within the chamber;
(d) means for controlling the means for blocking, preventing complete exhaustion of compressed air from the chamber by again blocking the exhaust ports after initial air discharge from the chamber; and
(e) actuating means for causing the means for blocking the exhaust ports to move such that the exhaust ports are unblocked to allow compressed air to be discharged from the chamber.

13. A seismic source apparatus as set forth in claim 12 wherein said actuating means comprises a solenoid element.

14. A seismic source apparatus comprising:
(a) a housing having a chamber located within with a plurality of exhaust ports;
(b) means for supplying the housing with compressed air;
(c) means for blocking the exhaust ports disposed within the chamber;
(d) means for controlling the means for blocking, preventing complete exhaustion of compressed air from the chamber by again blocking the exhaust ports after initial air discharge from the chamber; and
(e) relief valve means, connected to the means for controlling, for releasing compressed air in the chamber.

15. A seismic source apparatus comprising:
(a) a housing having a chamber located within, with a plurality of exhaust ports;
(b) means for supplying the housing with compressed air;
(c) means for blocking the exhaust ports disposed within the chamber;
(d) means for controlling the means for blocking, preventing complete exhaustion of compressed air from the chamber by again blocking the exhaust ports after initial air discharge from the chamber, and
(e) decelerating means for cushioning the upward movement of the means for controlling.

* * * * *

UNITED STATES PATENT AND TRADEMARK OFFICE
CERTIFICATE OF CORRECTION

PATENT NO.  : 4,230,201

DATED       : October 28, 1980

INVENTOR(S) : Marvin G. Bays, et al

It is certified that error appears in the above-identified patent and that said Letters Patent is hereby corrected as shown below:

On the title page, Item [75]: change applicant(s) "Marvin Gene Bays" to read applicants --Marvin Gene Bays, Roy C. Johnston, John T. Thomson, Ernest R. Harrison Change, Attorney, to read --Melvin Sharp and Leo Heiting Signed and Sealed this Twenty-ninth Day of June, 1993

Attest:

MICHAEL K. KIRK

*Attesting Officer*    *Acting Commissioner of Patents and Trademarks*